(12) United States Patent
Nowak et al.

(10) Patent No.: US 8,855,591 B2
(45) Date of Patent: Oct. 7, 2014

(54) PRESELECTOR INTERFERENCE REJECTION AND DYNAMIC RANGE EXTENSION

(75) Inventors: Michael E. Nowak, Andover, MN (US); William D. Verhoef, Andover, MN (US); Eric D. Corndorf, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 233 days.

(21) Appl. No.: 13/398,917

(22) Filed: Feb. 17, 2012

(65) Prior Publication Data

US 2012/0147791 A1 Jun. 14, 2012

Related U.S. Application Data

(63) Continuation of application No. 12/261,158, filed on Oct. 30, 2008, now Pat. No. 8,126,418.

(51) Int. Cl.
*H04B 1/10* (2006.01)
*H04Q 9/00* (2006.01)
*A61N 1/08* (2006.01)
*H04B 1/14* (2006.01)

(52) U.S. Cl.
CPC .. *H04Q 9/00* (2013.01); *A61N 1/08* (2013.01); *H04B 1/14* (2013.01); *H04Q 2209/40* (2013.01)
USPC .......................................................... 455/283

(58) Field of Classification Search
CPC ................................. H04B 1/18; H03G 11/004
USPC .............. 455/82, 83, 283, 284, 296, 303, 305
See application file for complete search history.

(56) References Cited

U.S. PATENT DOCUMENTS

| | | | |
|---|---|---|---|
| 3,550,011 A | 12/1970 | Dubowicz et al. | |
| 4,132,952 A | 1/1979 | Hongu et al. | |
| 4,528,698 A | 7/1985 | Fraser | |
| 4,691,571 A | 9/1987 | Matzuk | |
| 5,548,831 A | 8/1996 | Bijker et al. | |
| 5,970,105 A | 10/1999 | Dacus | |
| 6,115,636 A | 9/2000 | Ryan | |
| 6,167,258 A | 12/2000 | Schmidt et al. | |
| 6,482,154 B1 | 11/2002 | Haubrich | |
| 7,003,096 B2 * | 2/2006 | Lashley et al. | 379/406.01 |
| 7,006,162 B2 | 2/2006 | Cowley et al. | |
| 8,023,916 B2 * | 9/2011 | Oe | 455/278.1 |
| 2005/0026564 A1 | 2/2005 | Haub et al. | |
| 2007/0202815 A1 | 8/2007 | Birkett et al. | |
| 2009/0093756 A1 | 4/2009 | Minaie et al. | |
| 2010/0027596 A1 * | 2/2010 | Bellaouar et al. | 375/219 |

* cited by examiner

*Primary Examiner* — Sibin Chen
(74) *Attorney, Agent, or Firm* — Michael J. Ostrom; Stephen W. Bauer

(57) ABSTRACT

A wireless telemetry module and associated method reject interference in a received signal. The wireless telemetry module includes an antenna receives a communication signal transmitted at a desired channel frequency and having a channel bandwidth. A transceiver is controlled to operate in receiving and transmitting modes by a processor. An interference rejection module receives control signals from the processor corresponding to the desired channel frequency and is coupled between the antenna and the transceiver when the transceiver is operating in the receiving mode.

20 Claims, 8 Drawing Sheets

PRESELECTOR INTERFERENCE REJECTION AND DYNAMIC RANGE EXTENSION

This application is a continuation of U.S. application Ser. No. 12/261,158, filed Oct. 30, 2008 now U.S. Pat. No. 8,126,418, which is incorporated herein by reference in its entirety.

TECHNICAL FIELD

This disclosure relates generally to telemetry modules for medical device systems and, in particular, to a telemetry module including interference rejection.

BACKGROUND

Medical devices often include telemetry circuitry for wirelessly communicating with other devices or monitors. For example, an implantable medical device typically includes a telemetry module capable of bidirectional communication with an external programmer or home monitor for programming and adjusting operating parameters in the implanted device and for retrieving data from the implanted device.

In the past, implantable medical device telemetry systems required a programming head including an antenna to be held directly over the implanted device. Advances made in telemetry systems allow wireless communication over a distance of a few meters, sometimes referred to as "distance telemetry", without the use of a programming head. Telemetry modules incorporated in implantable devices are designed to operate using a relatively low current to prevent excessive battery drain which would shorten the longevity of the implanted device. In the external programmer, home monitor or other device communicating with the implanted device, the telemetry module needs to be sensitive to the desired signals but can be susceptible to interference both within the communication bandwidth and outside the communication bandwidth. Undesired interference signals can block or impair receiving operations of a low dynamic range receiver. It is desirable to improve the tolerance of low dynamic range telemetry systems to interference signals in medical device systems.

DETAILED DESCRIPTION

Figure 1A:
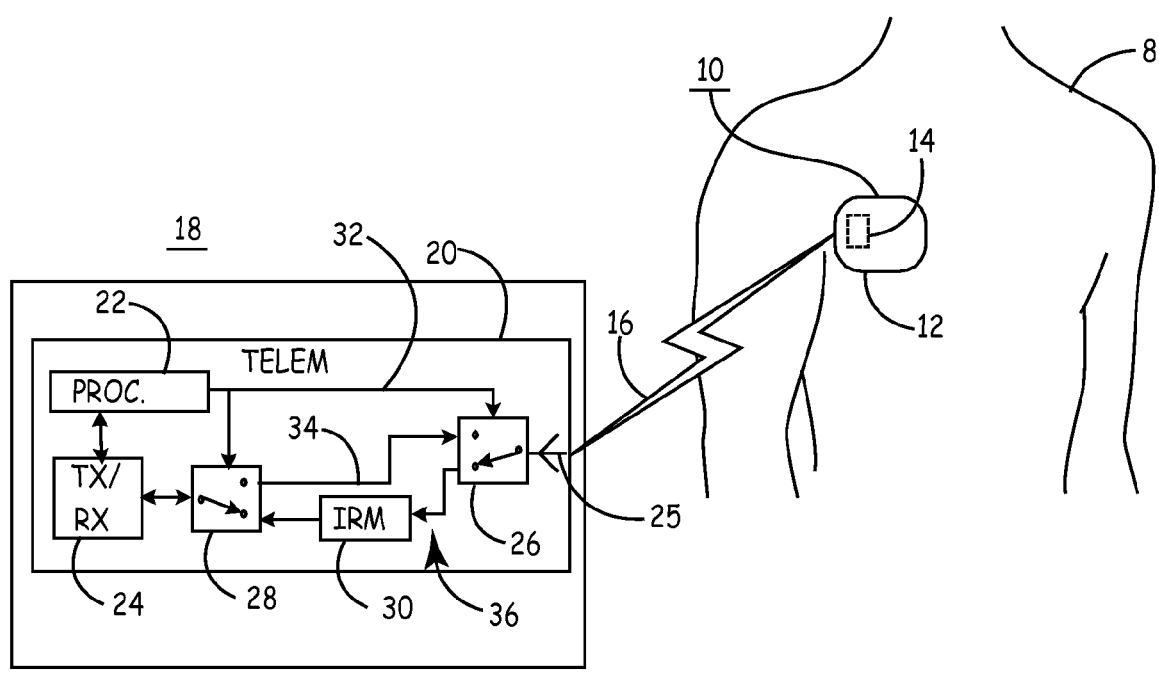
FIG. 1A is a schematic diagram of one embodiment of a medical device system enabled for wireless telemetry communication.

In the following description, references are made to illustrative embodiments. It is understood that other embodiments may be utilized without departing from the scope of the invention. For purposes of clarity, the same reference numbers are used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

FIG. 1A is a schematic diagram of one embodiment of a medical device system enabled for wireless telemetry communication. An implantable medical device (IMD) 10 is shown implanted in a patient's body 8. IMD 10 may correspond to numerous types of implantable devices including pacemakers, cardioverter defibrillators, ECG recorders, hemodynamic monitors, drug pumps, neurological stimulators, or any other implantable device implemented to monitor a physiological condition and/or delivery a therapy. IMD 10 typically includes a hermetically sealed housing 12, which encloses a power supply and electronic circuitry (not shown for the sake of simplicity) for controlling device functions. IMD 10 includes a wireless telemetry module 14 capable of bidirectional communication with an external device 18 via link 16.

External device 18 may be implemented as a programmer used to program an operating mode and associated operating parameters in IMD 10. Programming data is transmitted from external device 18 to IMD 10 via link 16. External device 18 may additionally or alternatively be used to interrogate IMD 10 to retrieve data acquired by IMD 10. Retrieved data may include physiological data recorded by the IMD or collected in real time as well as data relating to IMD 10 performance or functional status, for example device-related data obtained during self-diagnostic functions performed by the IMD. Thus, external device 18 may be implemented, for example, as a home monitor or a clinical programmer. External device may also include patient monitoring functions, such as ECG recording, blood pressure monitoring, or the like. In various embodiments, external device 18 may be capable of programming IMD 10, storing or processing data retrieved from IMD 10, transmitting or receiving data to/from a centralized patient management database or other networked location, and sending or receiving alerts or other notifications. The overall functionality of external device 18 may vary between embodiments but will at least include wireless telemetric communication with IMD 10 via link 16 for transferring data to/from IMD 10.

As such, external device 18 is provided with a telemetry module 20 including an antenna 25 for receiving and transmitting signals to IMD 10, a transceiver module 24, also referred to herein simply as "transceiver", and a processor 22 or other control circuitry for controlling the function of telemetry module 20. Telemetry module 20 further includes an interference rejection module (IRM) 30 which couples antenna 25 to transceiver module 24 during receiving operations. IRM 30 is coupled to transceiver module 24 via switches 26 and 28 controlled by processor 22 via control signal 32. During transmission operations, processor 22 provides a control signal 32 which causes switches 26 and 28 to switch to a transmission pathway state. IRM 30 is bypassed during transmission operations. Transceiver 24 transmits a communication signal via switch 28, transmission pathway 34, switch 26 and antenna 25. The communication signal is received by IMD 10 via wireless communication link 16.

During receiving operations, processor 22 is configured to switch switches 26 and 28 to a receiving pathway state (as represented in FIG. 1) using control signal 32. IRM 30 is coupled to antenna 25 via switch 26 and to transceiver 24 via switch 28. In this way, transceiver 24 receives a wireless communication signal transmitted by IMD 10 via link 16 and a receiving pathway 36 that includes IRM 30. The signal transmitted by IMD 10 is received by transceiver 24 via antenna 25, switch 26, IRM 30, and switch 28. The communication signal undergoes interference rejection by IRM 30 prior to being received by transceiver 24. As will be described in detail herein, IRM 30 reduces the susceptibility of transceiver 24 to interference thereby extending the dynamic range of telemetry module 20.

The IMD telemetry module 14 is not shown in detail in FIG. 1A, but it is to be understood that telemetry module 14 may include components corresponding to those described for telemetry module 20. Generally, a receiver implanted in the body will be less susceptible to interference than an external receiver because the patient's body acts to attenuate interference signals. Thus, an IRM 30 included in an external device 18 as shown in FIG. 1 may be optional in an associated implantable device 10. It is recognized, however, that an IRM 30 may be included in any external or implantable medical device intended to communicate with any other external or implantable medical device. A telemetry module including IRM 30 is not limited to use in an external device communicating with an implantable device. For example, embodiments of a telemetry module described herein may be implemented in a medical device system including two or more external devices communicating wirelessly with each other, two or more implantable medical devices implanted in a patient's body and communicating with each other, or any combination of external and implantable devices. A medical device in which telemetry module 20 is implemented is referred to herein as a "host device."

Furthermore, it is recognized that embodiments of an interference rejection module described herein are not limited to use in medical device telemetry systems but may be implemented in any device intended to receive wireless telemetry signals. Wireless telemetry signals may include signals in a radio frequency range, ultrasonic range or infrared range. Illustrative embodiments described herein relate to RF telemetry communication, however, the interference rejection methods and apparatus described herein are not limited to RF telemetry systems.

Components included in the implantable telemetry module 14 and the external telemetry module 20 such as antenna 25, transceiver 24 and processor 22 may generally correspond to those included in telemetry systems described, for example, in U.S. Pat. No. 6,482,154 (Haubrich et al.), incorporated herein by reference in its entirety.

Figure 1B:
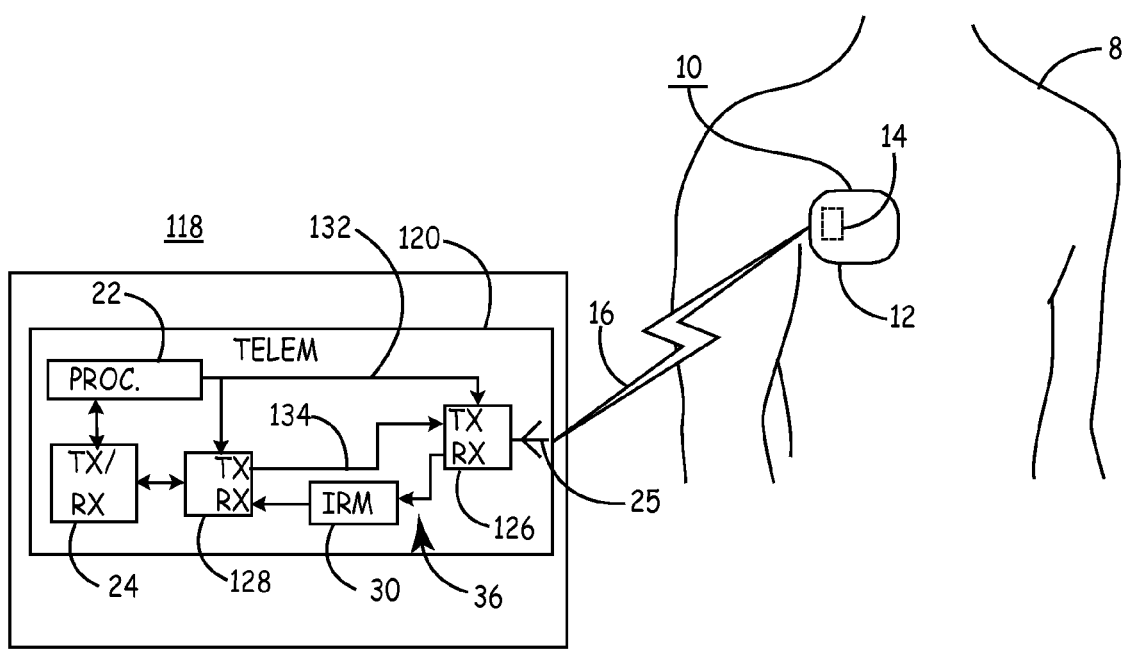
FIG. 1B is schematic diagram of an alternative embodiment of a medical device wireless telemetry communication system including an interference rejection module.

FIG. 1B is schematic diagram of an alternative embodiment of a medical device wireless telemetry communication system including an interference rejection module. Identically numbered elements correspond to those described above in conjunction with FIG. 1A. External device 118 includes a telemetry module 120 enabled for simultaneous bidirectional communication in a full duplex mode. The system shown in FIG. 1A can generally be referred to as a half-duplex system in that transmitting and receiving occurs non-simultaneously, for example in time division duplexing controlled by processor 22. In a full duplex system transmission and receiving can occur simultaneously using different operating channels. In telemetry module 120, transceiver 24 is coupled to antenna 25 via diplexers 128 and 126 which control the transmission of data using a different channel frequency than the channel frequency used for receiving, i.e., frequency division duplexing. IRM 30 is coupled between diplexers 128 and 126 along the receiving pathway 36.

Embodiments described hereafter refer generally to a telemetry module operating in time division duplexing and including pre- and post-IRM switches operating as described above and shown in FIG. 1A. It is recognized, however, that any of the embodiments described herein may alternatively be implemented in a full duplex system incorporating diplexers as shown in FIG. 1B.

Figure 2:
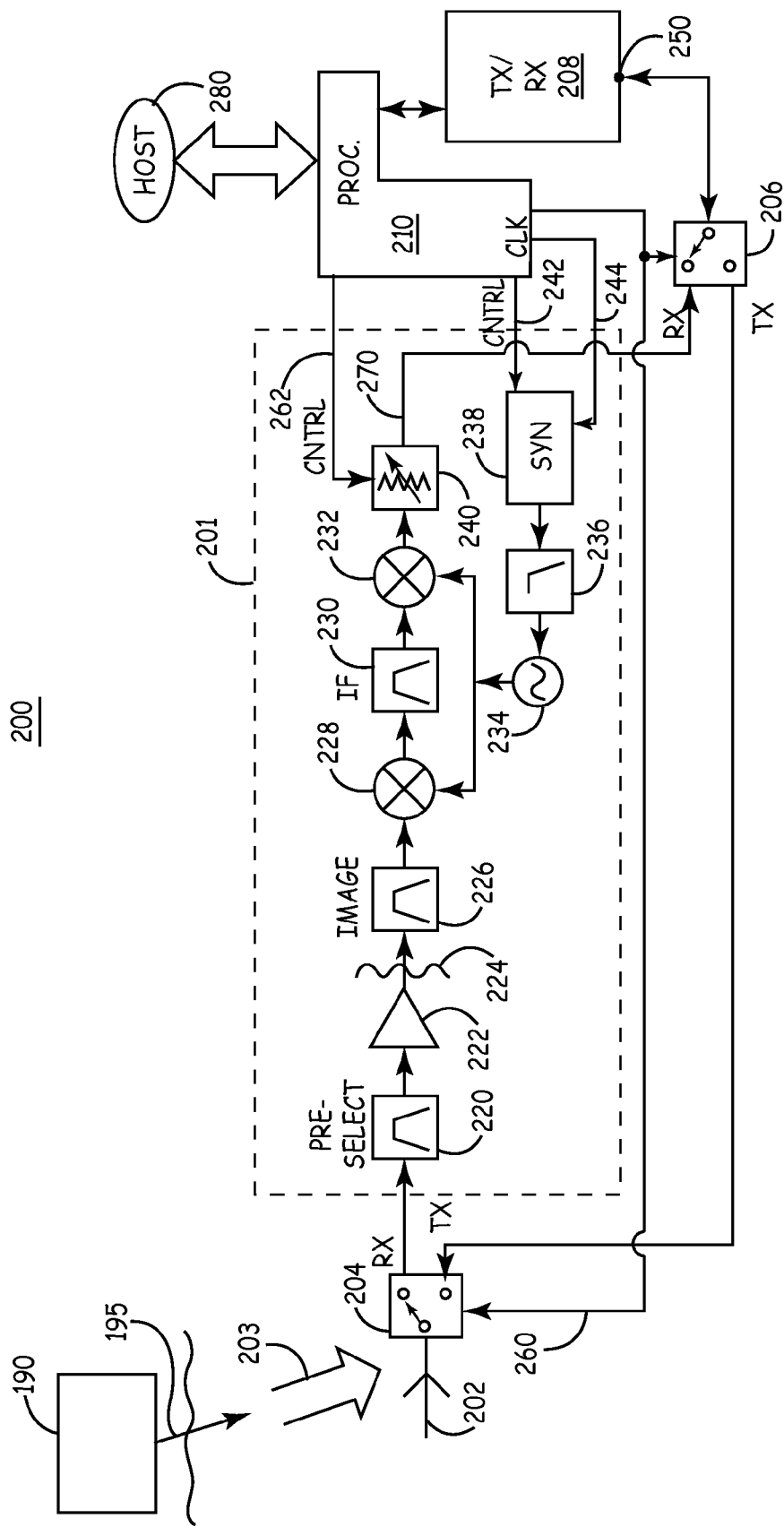
FIG. 2 is a functional block diagram of one embodiment of a telemetry module including an interference rejection module (IRM).

FIG. 2 is a functional block diagram of one embodiment of a telemetry module 200 including an IRM 201. Telemetry module 200 includes an antenna 202, IRM 201, pre-IRM switch 204, post-IRM switch 206, processor 210 and transceiver 208. Antenna 202 is provided for receiving off-the-air radio frequency (RF) signals transmitted by another medical device 190 and for transmitting communication signals from transceiver 208. Processor 210 controls transceiver 208 to operate in either a transmission mode or in a receiving mode. During a transmission mode, processor 210 provides a control signal 260 to pre- and post-IRM switches 204 and 206 to select a transmission pathway from the transceiver RF antenna port 250 to antenna 202 via switches 204 and 206 bypassing IRM 201. During a receiving mode, processor 210 provides a control signal 260 to pre- and post-IRM switches 204 and 206 to select a receiving pathway from antenna 202 through IRM module 201 to transceiver 208.

Various control methods may be used for controlling the timing of alternation of transceiver 208 between a transmitting mode and a receiving mode. In one embodiment, processor 210 controls transceiver 208 to operate in transmitting and receiving modes in alternating blocks of time, which may be further divided into frames, for transmitting or receiving data. Processor 210 selects the transmission or receiving pathway accordingly by providing control signal 260 to cause pre- and post-IRM switches 204 and 206 to switch between states, thus selecting the transmission pathway bypassing IRM 201 or the receiving pathway including IRM 201.

During a receiving mode, antenna 202 receives a signal 203 which includes a desired communication signal 195 transmitted by another device 190 and can include various interference signals. Signal 203 received at antennal 202 can be referred to as a "composite signal" in that antenna 202 will receive the desired communication signal 195 as well as interference signals that may exist across a spectrum of frequencies. The desired communication signal 195 is a wireless telemetry signal transmitted from another medical device 190 at a selected channel frequency having a relatively narrow channel bandwidth. The received signal 203 may further include both in-band interferers, i.e. noise signals having frequencies falling within a range of communication channel frequencies over which transceiver 208 is configured to operate, and out-of-band interferers, i.e. noise signals having frequencies outside the range of communication channel frequencies. For example, if telemetry module 200 is configured to operate over a range of 401 to 406 MHz, encompassing a range of MEDS and MICS channels commonly used in medical devices, in-band interferers are those falling within the 401 to 406 MHz range and out-of-band interferers are those falling outside the 401 to 406 MHz range. As such, while "signal" 203 is referred to herein in the singular from, it is recognized that "signal" 203 will typically include a spectrum of signal frequencies including the desired communication signal frequency and the frequencies of any in-band and out-of-band interferers.

These in-band and out-of-band interferers, also referred to generally herein as "interference signals", can impair the sensitivity of transceiver 208, particularly when distance telemetry is performed such as across a room, e.g., across about 3 meters or more. At shorter distances, e.g., less than one meter, undesired interferers may be tolerated by a low dynamic range receiver. However, at greater distances, a higher power transmission signal is typically required to compensate for interferers. To avoid requiring higher power transmission signals while still allowing successful communication with a low dynamic range receiver, IRM 201 is implemented in telemetry module 200 to attenuate interference signals while having a non-significant net effect on the received communication signal 195. Thus, IRM 201 as described herein effectively adapts a low dynamic range telemetry module to function as a relatively higher dynamic range telemetry module without altering the transceiver itself.

IRM 201 includes a pre-selector filter 220, low noise amplifier 222, an optional attenuator 224, an image filter 226, a pre-mixer 228, an intermediate frequency (IF) filter 230, a post-mixer 232, gain control 240, local oscillator 234, loop filter 236, and synthesizer 238. Pre-selector filter 220 is provided as a bandpass filter selected to pass a range of frequencies corresponding to the range of operating channel frequencies to be received by transceiver 250. Pre-selector filter 220 will attenuate out-of-band interferers but does not significantly alter in-band interferers. In one embodiment, pre-selector filter 220 passes frequencies in the range of 401 to 406 MHz, associated with the MEDS and MICS RF channel range.

Low noise amplifier 222 reduces insertion loss of the communication signal 195 by amplifying the output of pre-selector filter 220. Image filter 226 suppresses undesired interferers before mixing. Image filter 226 removes interference signals that may produce the same intermediate frequency as the desired communication signal 195 after mixing the received signal 203 to an intermediate frequency in a superheterodyne scheme. Thus, pre-selector filter 220 and image filter 226 generally remove out-of-band interferers present in the received signal 203 while passing communication signal 195 and any in-band interferers present in the received signal 203.

Pre-mixer 228 mixes the output of image filter 226 to translate the communication signal 195 to an intermediate frequency corresponding to the center frequency of IF filter 230. In one embodiment, pre-mixer 228 is implemented to up-convert the communication signal 195 to a higher intermediate frequency. Alternatively, pre-mixer 228 is implemented to down-convert the communication signal 195 to a lower intermediate frequency. Thus the center frequency of IF filter 230 may be above or below the channel frequency of the communication signal 195. Local oscillator 234 is tuned to provide a signal frequency that is either the sum or the difference of the communication signal channel frequency and the IF filter center frequency.

The pre-mixer 228 mixes the output of image filter 226 with the local oscillator signal to produce a signal that will include the original communication signal channel frequency, the oscillator signal frequency, and the communication signal channel frequency translated to the IF filter center frequency, as well as other unwanted signal frequencies associated with interferers.

For example, if the communication signal 195 is transmitted at a channel frequency of 403 MHz and the IF filter 230 has a center frequency of 80 MHz, the local oscillator 234 may be tuned to provide pre-mixer 228 a 483 MHz signal or a 323 MHz signal. In a down-conversion operation, pre-mixer 228 will use a 483 MHz local oscillator signal to produce a mixed signal having a component at the IF filter center frequency of 80 MHz, equal to the difference of the local oscillator frequency 483 MHz and the communication signal channel frequency of 403 MHz.

In an alternative embodiment, local oscillator 234 is tuned to provide a signal to pre-mixer 228 that results in a mixed signal offset from the center frequency of the IF filter 230. This offset mixed signal is used to increase interference rejection on one side of the desired communication signal. The desired communication signal is offset toward an edge of the IF filter pass band, and interference signals occurring at frequencies adjacent to the desired communication signal undergo a greater offset from the IF filter center frequency, further into the rejection portion of the IF filter. This offset mixing signal provided by the local oscillator 234 is desirable, for example, when interference signals occur with greater probability on one side of desired communication signal frequency, i.e., either at higher frequencies or at lower frequencies than the desired communication signal.

Local oscillator 234 is tuned to provide the desired mixing frequency by a control signal received from loop filter 236 and synthesizer 238. Synthesizer 238 receives a control signal 242 and a reference clock signal 244 from processor 210 for use in adjusting local oscillator 234. The control signal 242 communicates the frequency of a selected communication channel when transceiver 208 is operating in a receiving mode. Synthesizer 238 locks the local oscillator frequency at an appropriate frequency for up- or down-conversion of the communication signal 195 to the IF filter center frequency. It is recognized that the exact local oscillator frequency used for translating the communication signal 195 to the IF filter center frequency will typically correspond to a multiple of the reference clock signal 244 provided by processor 210.

The mixed signal output of pre-mixer 228 is filtered by IF filter 230. IF filter 230 has a pass band at least as wide as the communication signal channel bandwidth. IF filter 230 may represent a single filter or a series combination of filters selected to provide the desired frequency response, in particular a desired center frequency, pass band width, and signal attenuation outside the pass band. The IF filter 230 thus removes interferers outside this single channel bandwidth, including in-band interferers which fell within the transceiver communication channel range prior to mixing by mixer 228.

In a superheterodyne receiver, an IF signal output of IF filter 230 would typically be amplified and provided to a demodulator operating on the IF frequency. In contrast, IRM 201 includes post-mixer 232 which translates the IF filter output back to the original channel frequency of the communication signal 195. Post-mixer 232 also receives input from local oscillator 234 for essentially reversing the mixing operation performed by pre-mixer 228. If pre-mixer 228 up-converts the received signal 203, post-mixer 232 down-converts the IF filter output and vice versa. In this way, the output of post-mixer 232 includes the communication signal 195 translated back to its original channel frequency, but both in-band and out-of-band interferers present in the received signal 203 will be removed or attenuated by IF filter 230.

In the example given above, received signal 203 includes communication signal 195 transmitted at a channel frequency of 403 MHz. Pre-mixer 228 down-converts the 403 MHz signal to the IF filter center frequency of 80 MHz using a local oscillator frequency signal of 483 MHz. Post-mixer 232 will then up-convert the output of IF filter 230 having an IF of 80 MHz to the desired channel frequency of 403 MHz using the local oscillator frequency of 483 MHz.

The output of post-mixer 232 is provided to gain control 240. Gain control 240 may be implemented as a variable gain amplifier receiving an automatic level control signal 262 from processor 210. Gain control 240 operates to maintain a uniform amplitude of the IRM output signal 270 across the communication channel range of transceiver 208. Gain control 240 provides consistent gain across varying frequencies and operating temperatures and compensates for amplitude variability, which may be a net gain or a net loss, of the cascaded components included in IRM 201. The IRM output signal 270 is thereby provided to transceiver 208 and includes the communication signal 195 with a fixed gain (such as unity gain or other selected net gain or loss) and its original channel frequency preserved. It is recognized that gain control 240 may be implemented at other locations in the IRM 201 rather than after the post-mixer 232. However, uniform gain of the communication signal 195 across the channel range is expected to be optimally achieved by implementing gain control 240 at the end of the cascade of IRM 201 components.

Transceiver 208 receives IRM output signal 270 without requiring any amplitude or frequency offset signals or any other adjustments or modifications. In other words, the interference rejection process performed by IRM 201 is transparent to transceiver 208. The IRM output signal 270 is provided to transceiver 208 with the original signal amplitude and frequency of the communication signal 195 substantially preserved, as if the communication signal 195 has been passed directly from antenna 202 to transceiver 208 but with the major difference of having both in-band and out-of-band interference signals removed or attenuated. Telemetry module 200 is thus more tolerant of interference allowing transceiver 208 to function as a high dynamic range receiver without altering or adjusting transceiver 208 itself. The IRM 201 can be considered a modular component in that it can be added "in front of" an existing transceiver 208 in a telemetry module 200 without requiring design changes or modifications to the transceiver 208.

Control signal 242 from processor 210 allows local oscillator 234 to be locked into different frequencies corresponding to different channels spanning an operating communication channel range. In this way, IRM 201 can be adjusted to remove interferers from received signal 203 over a range of communication channels. Single channel frequencies over a range of operating channels can be scanned by telemetry module 200 through the adjustment of local oscillator 234 under control of processor 210. A variable control signal 242 allows IRM 201 to pass communication signals corresponding to the range of single channel frequencies spanning the operating communication channel range. As transceiver 208 changes channels, for example in response to a communication error, IRM 201 can immediately be adjusted to pass communication signals corresponding to the newly selected channel. Communication errors can occur in the presence of co-channel interference signals. By moving to a different channel, those in-band interference signals falling in a previously selected channel bandwidth are attenuated by IRM 201.

Transceiver 208 receives the IRM output signal 270 and provides the received signal to processor 210. Processor 210 transfers received data to host interface 280 for use by the host medical device in which telemetry module 200 is incorporated. The received data may include programming data used by the host device in controlling host device functions or for transmission to another host device. The received data may include an interrogation command instructing the host device to retrieve data from memory or in real-time for transmission by telemetry module 200 to the requesting medical device 190 or to a computer network.

Figure 3:
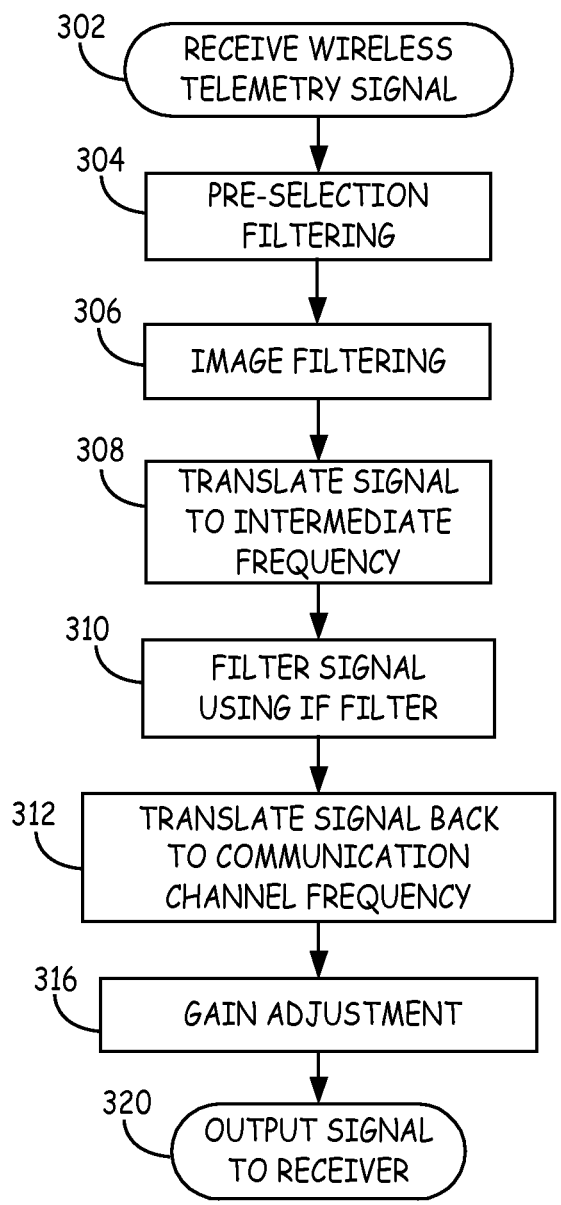
FIG. 3 is a flow chart of one embodiment of a method for rejecting interference during wireless telemetry communication.

FIG. 3 is a flow chart of one embodiment of a method for rejecting interference during wireless telemetry communication. Flow chart 300 is intended to illustrate the functional operation of a telemetry module, and should not be construed as reflective of a specific form of software or hardware necessary to practice the illustrative method. It is believed that the particular form of hardware will be determined primarily by the particular system architecture employed in the device and by the particular telemetry methodologies employed by the device. Providing analog and/or digital hardware, software and/or firmware to accomplish the described functionality in the context of any modern medical device, given the disclosure herein, is within the abilities of one of skill in the art.

Methods described in conjunction with flow charts presented herein may be implemented, at least in part, in a computer-readable medium that includes instructions for causing a programmable processor to carry out the methods described. A "computer-readable medium" includes but is not limited to any volatile or non-volatile media, such as a RAM, ROM, CD-ROM, NVRAM, EEPROM, flash memory, and the like. The instructions may be implemented as one or more software modules, which may be executed by themselves or in combination with other software.

At block 302, a wireless telemetry signal is received by an antenna of a telemetry module. The wireless telemetry signal, also referred to herein as the "communication signal", undergoes pre-selection filtering at block 304 and image filtering at block 306. Pre-selection filtering and image filtering removes or attenuates out-of-band interferers as described above in conjunction with FIG. 2.

At block 308, the filtered signal is translated or "mixed" to an intermediate frequency. The signal translation may involve up conversion or down conversion of the communication signal frequency to a higher or lower IF, respectively. At block 310, the translated signal is filtered using an IF filter having a bandwidth at least as wide as the desired communication channel bandwidth, but narrower than an operating frequency range including multiple channels. The filtered IF signal is then translated or "mixed" back to the original communication channel frequency at block 312.

Gain adjustment can be performed at block 316, e.g., using a variable gain amplifier and/or low noise amplifier, to provide an output signal having a fixed gain (such as unity gain or other selected net gain or loss) relative to the received communication signal. The gain adjustment maintains the amplitude of the output signal at the expected communication channel amplitude. In this way, an output signal provided to a receiver at block 320 is characterized by a frequency and amplitude approximately equal to the intended communication signal frequency and amplitude but both in-band and out-of-band interferers are been removed or attenuated.

Figure 4:
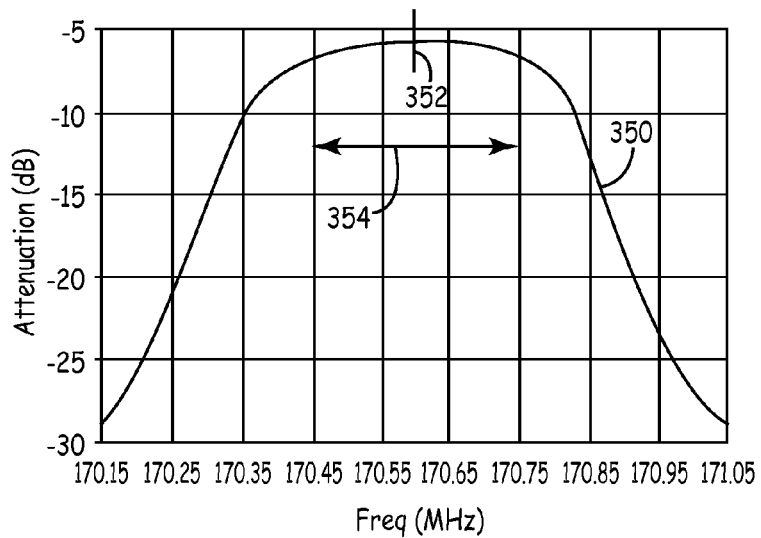
FIG. 4 is a plot of the insertion loss of an intermediate frequency filter appropriate for use in the IRM of FIG. 2.

FIG. 4 is a plot of the insertion loss 350 of an IF filter appropriate for use in IRM 201 of FIG. 2. The illustrative IF filter is characterized by a center frequency 352 of 170.6 MHz and pass band 354 of approximately 170.45 MHz to 170.75 MHz, corresponding to a single communication channel bandwidth of 300 KHz. Limited amplitude attenuation and ripple of less than 1 dB within this pass band 354 minimizes the impact of the IF filter on the amplitude of a received communication signal translated to the IF filter center frequency 352. Interferers falling outside this pass band 354, however, will be significantly attenuated.

Figure 5A:
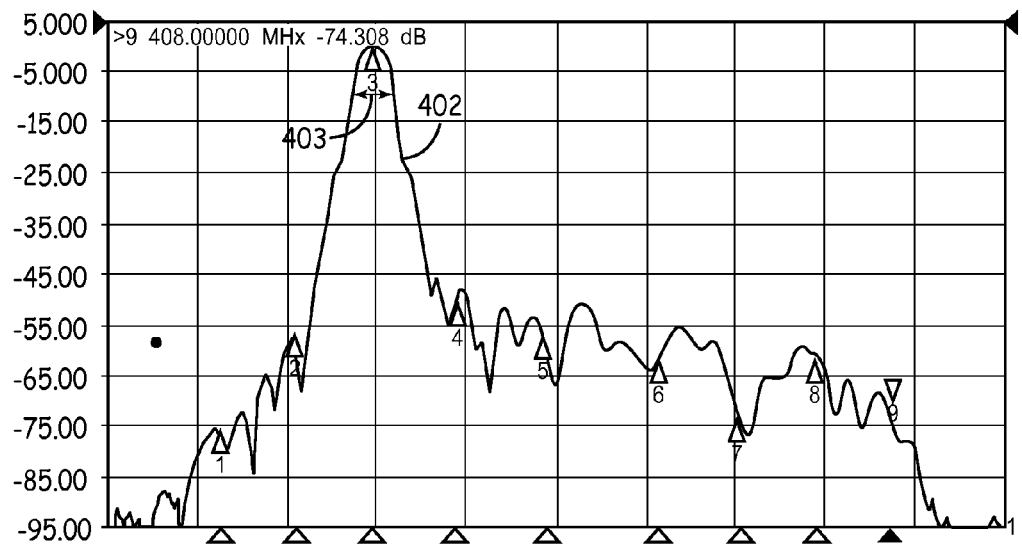
FIGS. 5A through 5E are plots of the output signal of an IRM for five different communication channel frequencies.
Figure 5B:
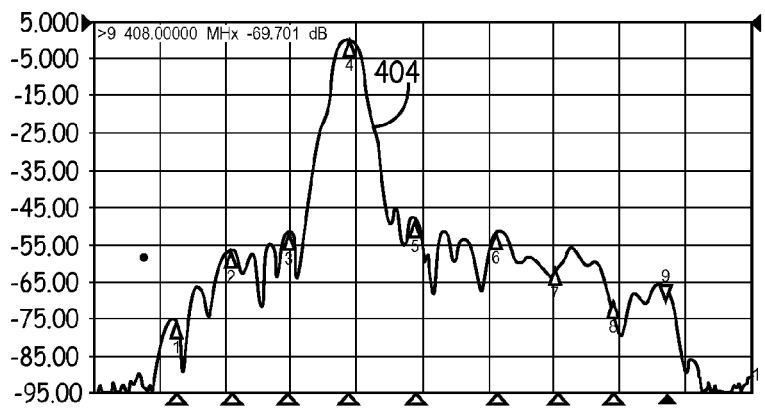
Figure 5C:
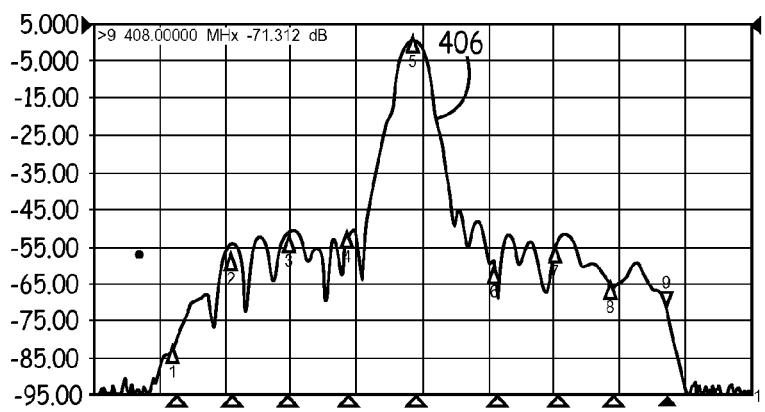
Figure 5D:
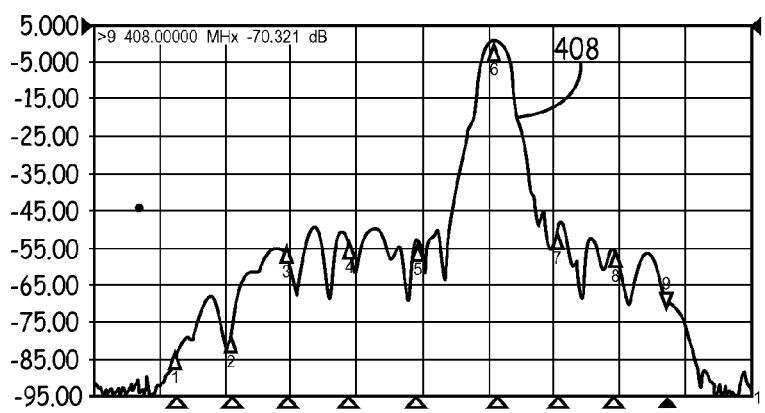
Figure 5E:
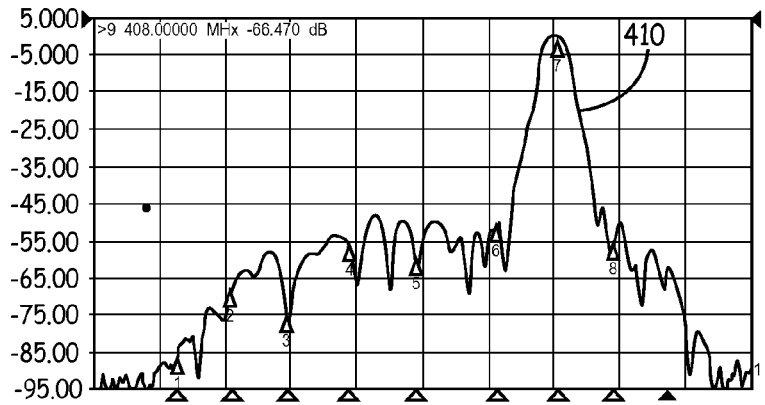

FIGS. 5A through 5E are plots of the output signal of an IRM for five different RF communication channel frequencies. An IRM was implemented according to the IRM 201 shown in FIG. 2 using a 170.6 MHz IF filter. In FIG. 5A, a wireless telemetry signal at 401.05 MHz is received and mixed using a local oscillator frequency of 571.65 MHz (equal to the sum of the 401.05 MHz channel frequency and 170.6 MHz IF filter center frequency). In this example, the telemetry signal is first down-converted to the intermediate frequency by the pre-mixer then up-converted back to the communication signal channel frequency by the post-mixer.

As can be seen in FIG. 5A, the output signal 402 of the IRM module has minimal insertion loss along the channel bandwidth 403 with significant out-of-band interference rejection.

Analogous IRM output signals 404 through 410 can be seen in FIGS. 5B through 5E, respectively, for other channel frequencies corresponding to each of: 402.15 MHz (output signal 404 in FIG. 5B) mixed using a local oscillator frequency of 572.75 MHZ; 403.35 MHz (output signal 406 in FIG. 5C) mixed using a local oscillator frequency of 573.95 MHz; 404.85 MHz (output signal 408 in FIG. 5D) mixed using a local oscillator frequency of 575.45 MHz; and 405.95 MHz (output signal 410 in FIG. 5E) mixed using a local oscillator frequency of 576.55 MHz. The illustrated channel frequencies represented by the output signals 402 through 410 in FIGS. 5A through 5E correspond to channels defined by the MEDs and MICs bands.

Figure 6:
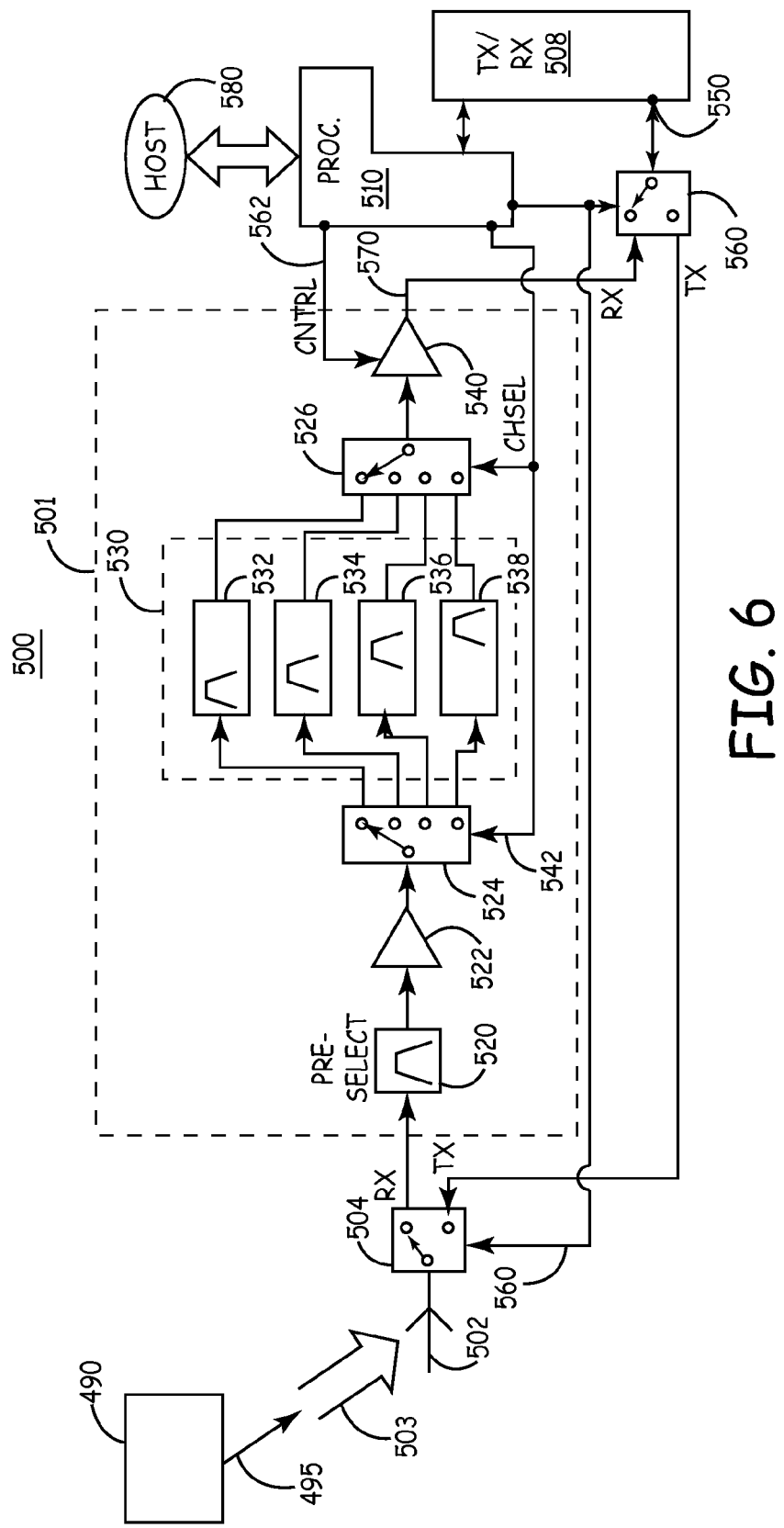
FIG. 6 is a functional block diagram of another embodiment of a telemetry module including an IRM.

FIG. 6 is a functional block diagram of a telemetry module 500 including an IRM 501. Telemetry module 500 includes an antenna 502, IRM 501, pre-IRM switch 504, post-IRM switch 506, processor 510 and transceiver 508. Antenna 502 is provided for receiving off-the-air radio frequency (RF) signals transmitted by another medical device 490 and for transmitting communication signals from transceiver 508. Processor 510 controls transceiver 508 to operate in either a transmission mode or in a receiving mode. During a transmission mode, processor 510 provides a control signal 560 to pre- and post-IRM switches 504 and 506 to select a transmission pathway from an RF antenna port 550 to antenna 502 via switches 504 and 506 bypassing IRM 501. During a receiving mode, processor 510 provides a control signal 560 to pre- and post-IRM switches 504 and 506 to select a receiving pathway from antenna 502 through IRM module 501 to transceiver 508.

During a receiving mode, antenna 502 receives a signal 503 which includes a desired communication signal 495 transmitted by another device 490 and can include various interference signals. The desired communication signal 495 is a wireless telemetry signal transmitted from medical device 490 at a selected channel frequency having a relatively narrow bandwidth. The received signal 503 may include both in-band and out-of-band interferers as generally described above in conjunction with FIG. 2.

IRM 500 includes pre-selector filter 520, low noise amplifier 522, pre-selection switch 524, post-selection switch 526, filter bank 530, and gain control 540. Pre-selector filter 520 is a bandpass filter which passes signal frequencies corresponding to a range of operating channels over which transceiver 508 is configured to communicate. As previously described, in one embodiment pre-selector filter 520 passes frequencies in the range of 401 MHz to 406 MHz corresponding to the MEDS and MICS channel frequencies often used in implantable medical device telemetry systems. As such, pre-selector filter 520 attenuates out-of band signals. Low noise amplifier 522 reduces the insertion loss of communication signal 495.

Pre-selection switch 524 and post-selection switch 526 are multi-pole switches used to select a filtering pathway through filter bank 530 corresponding to the frequency of the communication signal 495. Filter bank 530 includes two or more channel-specific filters 532 through 538 which are selectable using pre-selection and post-selection switches 524 and 526. Switches 524 and 526 are controlled by a control signal 542 provided by processor 510. Control signal 542 corresponds to the channel frequency of the communication signal 495.

Each channel-specific filter 532 through 538 included in filter bank 530 is implemented to have a center frequency corresponding to at least one communication channel frequency. Each filter 532 through 538 is further characterized by a pass band that is at least as wide as a single channel bandwidth but narrower than the overall channel range. For example, in one embodiment filters 532 through 538 are each provided as RF filters having a center frequency corresponding to at least one channel frequency included in the selected channel range of 401 to 406 MHz and each having a pass band of approximately 1.25 MHz.

Each of filters 532 through 538 may be embodied as a single filter or a series combination of filters to achieve the desired frequency response, i.e., a desired center frequency, pass band width, and signal attenuation outside the pass band. Furthermore, filters 532 through 538 may be selectable one at a time or in series combinations using switches (not shown) implemented within filter bank 530. In other words, filter bank 530 may be implemented as a network of switchable filters allowing different series combinations or single filters to be selected according to a selected operating channel.

The filtering provided by each channel-specific filter 532 through 538 removes interferers within the communication channel range by parsing the operating bandwidth of the overall communication channel range of transceiver 508 into segments containing one or more of the specific channels utilized in the channel range. It is recognized that a single filter within filter bank 530 may have a pass band that overlaps more than one channel frequency. As such, a single filter within filter bank 530 may be selected by multi-pole switches 524 and 526 for more than one communication signal frequency. Through implementation of custom designed filters, single channel selectivity may be realized or approximated. In one embodiment, each filter 532 through 538 included in bank 530 has a center frequency and pass band encompassing at least one single channel frequency and bandwidth. Each filter may encompass a different number of channels that other filters within filter bank 530. Single channel frequencies over a range of communication channels over which transceiver 508 operates can be scanned by telemetry module 500 through the control of multi-pole switches 532 through 538 under the control of processor 510. It is recognized that the number of filters implemented in bank 530 will depend on the number of channels which transceiver 508 operates on and the channel resolution achieved by the implemented filters. In telemetry systems utilizing ultrasound, infrared or other frequency bands, the filters used to form filter bank 530 may be selected accordingly.

The output of filter bank 530 is passed to gain control 540 via post-selection switch 526. Gain control 540 may be implemented as a variable gain amplifier receiving a control signal 562 from processor 510. As described previously, gain control 514 maintains a uniform gain output signal 570 across the communication channel range. Output signal 570 has a frequency equal to the desired communication signal 495, but with both in-band and out-of-band interferers removed or attenuated by pre-select filter 520 and filter bank 530.

The output signal 570 of IRM 501 is provided to transceiver 508 without adjustment or modification of transceiver 508. As such, IRM 501 operates transparently to transceiver 508. Telemetry module 500 is thus provided with an increased dynamic range without requiring a redesign or modification of transceiver 530.

Transceiver 508 receives the IRM output signal 570 and provides received data to processor 510. Processor 510 transfers received data to host interface 580 for use by the host medical device in which telemetry module 500 is incorporated. The received data may include programming data used by the host device in controlling host device functions. The received data may include an interrogation command instructing the host device to retrieve data from memory or in real-time for transmission by telemetry module 500 to the requesting medical device 490.

Figure 7:
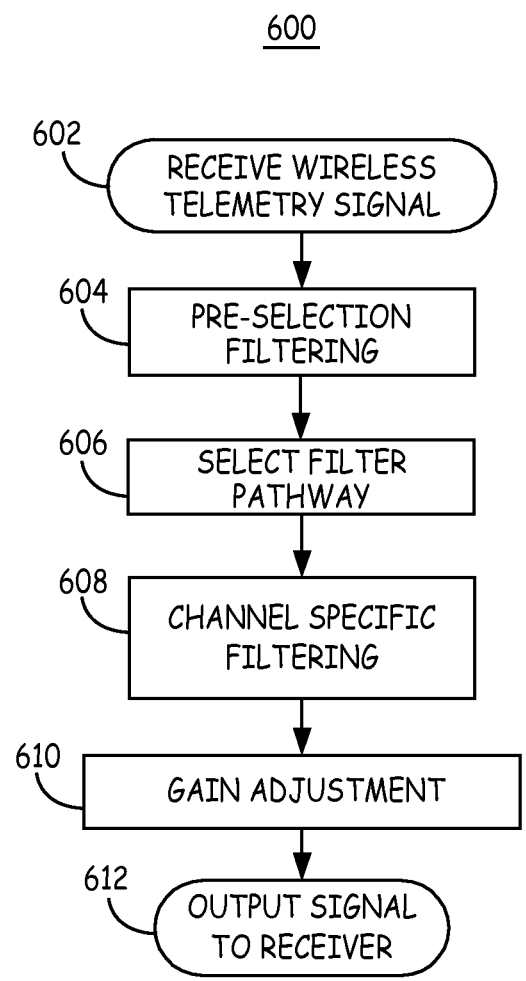
FIG. 7 is a flow chart of another method for rejecting interference in a medical device telemetry module.

FIG. 7 is a flow chart of one embodiment for rejecting interference in a medical device telemetry module. In method 600, a wireless telemetry signal is received at block 602 by an antenna of a telemetry module. The wireless telemetry signal, also referred to herein as the "communication signal", undergoes pre-selection filtering at block 604 to remove or attenuate out-of-band interferers.

At block 606, a channel-specific filter is selected according to the current operating channel frequency. The received signal is filtered by a channel-specific filter at block 608. The channel specific filter has a center frequency corresponding to the selected communication channel and a pass band narrower than the overall communication channel range over which an associated transceiver operates. Channel specific filtering at block 608 thus removes in-band interferers.

Gain adjustment can be performed at block 610, e.g., using a variable gain amplifier and/or low noise amplifier, to reduce insertion loss and thereby provide an output signal having a fixed gain (such as unity gain or other selected net gain or loss) relative to the desired communication signal across channel frequencies and operating temperatures. In this way, an output signal provided to a receiver at block 612 is characterized by a frequency approximately equal to the desired communication signal frequency, but both in-band and out-of-band interferers have been removed or attenuated.

Thus, a telemetry module and interference rejection methods have been presented in the foregoing description with reference to specific embodiments. It is appreciated that various modifications to the referenced embodiments may be made without departing from the scope of the invention as set forth in the following claims.

The invention claimed is:

1. A wireless telemetry module comprising:
   an antenna configured to receive a communication signal having a channel frequency and having a channel bandwidth;
   a transceiver configured to operate over a channel range of single channel frequencies including the channel frequency;
   a processor coupled to the transceiver and configured to control the transceiver to operate in a receiving mode and in a transmitting mode;
   an interference rejection module coupled between the antenna and the transceiver when the transceiver is operating in the receiving mode and bypassed when the transceiver is operating in the transmitting mode, the interference rejection module configured to attenuate interference signals occurring in a received signal and falling within the channel range and outside the channel range in response to the processor control signals, and provide the transceiver with the communication signal at the channel frequency;
   a diplexer for frequency duplexing the received signal with a simultaneously transmitted signal being transmitted by the transceiver; and
   a second diplexer, wherein the interference rejection module is coupled between the diplexers.

2. A wireless telemetry module comprising:
   an antenna configured to receive a communication signal having a channel frequency and having a channel bandwidth;
   a transceiver configured to operate over a channel range of single channel frequencies including the channel frequency, wherein the transceiver is configured to receive a range of single channel frequencies;
   a processor coupled to the transceiver and configured to control the transceiver to operate in a receiving mode and in a transmitting mode; and
   an interference rejection module coupled between the antenna and the transceiver when the transceiver is operating in the receiving mode and bypassed when the transceiver is operating in the transmitting mode, the interference rejection module configured to attenuate interference signals occurring in a received signal and falling within the channel range and outside the channel range in response to the processor control signals, and provide the transceiver with the communication signal at the channel frequency,
   wherein interference rejection module includes:
      a first filter configured to attenuate interference signals occurring in the received signal and falling outside of the channel range;
      a second filter configured to attenuate interference signals occurring in the received signal and falling within the channel range, wherein the second filter comprises an intermediate frequency filter
      a first mixer;
      an intermediate frequency filter including a center frequency and a pass band;
      a second mixer; and
      a local oscillator configured to provide a mixing signal;
      the first mixer receiving the received signal and the local oscillator mixing signal for translating the communication signal to fall within the intermediate frequency filter pass band in a mixed signal output, the intermediate frequency filter filtering the mixed signal output, and the second mixer receiving the filtered mixed signal output and the local oscillator signal for translating the filtered mixed signal back to the channel frequency, wherein the local oscillator receiving a control signal from the processor for controlling the local oscillator mixing signal frequency.

3. The wireless telemetry module of claim 2, wherein the first mixer is configured to translate the communication signal to the intermediate frequency, based up the local oscillator mixing signal frequency is controlled to cause filter center frequency.

4. The wireless telemetry module of claim 2, wherein the local oscillator mixing signal frequency is controlled to cause the first mixer to translate the communication signal to an intermediate frequency filter pass band frequency offset from the center frequency.

5. The wireless telemetry module of claim 2, wherein the processor is configured to provide the local oscillator with a variable control signal to cause the interference rejection module to pass communication signals to the transceiver corresponding to the range of single channel frequencies.

6. The wireless telemetry module of claim 2, wherein the intermediate frequency filter comprises a series combination of filters.

7. The wireless telemetry module of claim 2, further comprising:
   a first multi-pole switch and a second multi-pole switch,
   wherein the second filter comprises a plurality of selectable channel-specific filters each having a center frequency corresponding to at least one single channel frequency and the first multi-pole switch and the second multi-pole switch receiving a control signal from the processor for selecting a channel-specific filter corresponding to the channel frequency.

8. The wireless telemetry module of claim 7, wherein each of the plurality of selectable channel-specific filters having a pass band less than the channel range.

9. The wireless telemetry module of claim 7, wherein one of the plurality of selectable channel-specific filters comprises a series combination of filters.

10. The wireless telemetry module of claim 7, wherein the plurality of selectable channel-specific filters are selectable in series.

11. A method, comprising:
receiving a wireless signal comprising a communication signal transmitted at a channel frequency and having a single channel bandwidth;
controlling a transceiver to operate in a receiving mode and in a transmitting mode over a channel range of single channel frequencies including the channel frequency, wherein the transceiver is configured to receive a range of single channel frequencies;
coupling an interference rejection module between an antenna receiving the wireless signal and the transceiver when the transceiver is operating in the receiving mode;
bypassing the interference rejection module when the transceiver is operating in the transmitting mode;
controlling the interference rejection module to attenuate interference signals occurring in a received signal and falling outside the channel bandwidth within the channel range and outside the channel range in response to the processor control signals, wherein controlling the interference rejection module to attenuate interference signals comprises:
filtering the received signal using a first filter having a pass band corresponding to the channel range; and
filtering the received signal using a second filter having a pass band narrower than the channel range, wherein the second filter comprises a intermediate frequency filter having a pass band and a center frequency
generating a local oscillator signal corresponding to one of a sum and a difference of the channel frequency and a frequency within the intermediate frequency filter pass band;
mixing the received signal and a local oscillator signal for translating the communication signal to fall within the intermediate frequency filter pass band in a mixed signal output,
filtering the mixed signal output using the intermediate frequency filter, and
mixing the filtered mixed signal output and the local oscillator signal for translating the filtered mixed signal back to the channel frequency; and
providing the transceiver with the communication signal at the channel frequency.

12. The method of claim 11, further comprising a frequency duplexing the received signal and a simultaneously transmitted signal.

13. The method of claim 11, wherein the local oscillator signal corresponds to one of a sum and a difference of the channel frequency and the intermediate frequency filter center frequency.

14. The method of claim 11, wherein the local oscillator signal corresponds to one of a sum and a difference of the channel frequency and an intermediate frequency filter pass band frequency offset from the center frequency.

15. The method of claim 11, wherein the local oscillator signal is a variable control signal corresponding to the channel range.

16. The method of claim 11, wherein the intermediate frequency filter comprises a series combination of filters.

17. The method of claim 11, wherein the second filter comprises a plurality of selectable channel-specific filters each having a center frequency corresponding to at least one single channel frequency, the method further comprising selecting a channel-specific filter corresponding to the channel frequency.

18. The method of claim 17, wherein each of the plurality of selectable channel-specific filters having a pass band less than the channel range.

19. The method of claim 17, wherein one of the plurality of selectable channel-specific filters comprises a series combination of filters.

20. The method of claim 17, wherein selecting a channel-specific filter comprises selecting at least two of the plurality of selectable channel-specific filters in series.

* * * * *